Figure 1:
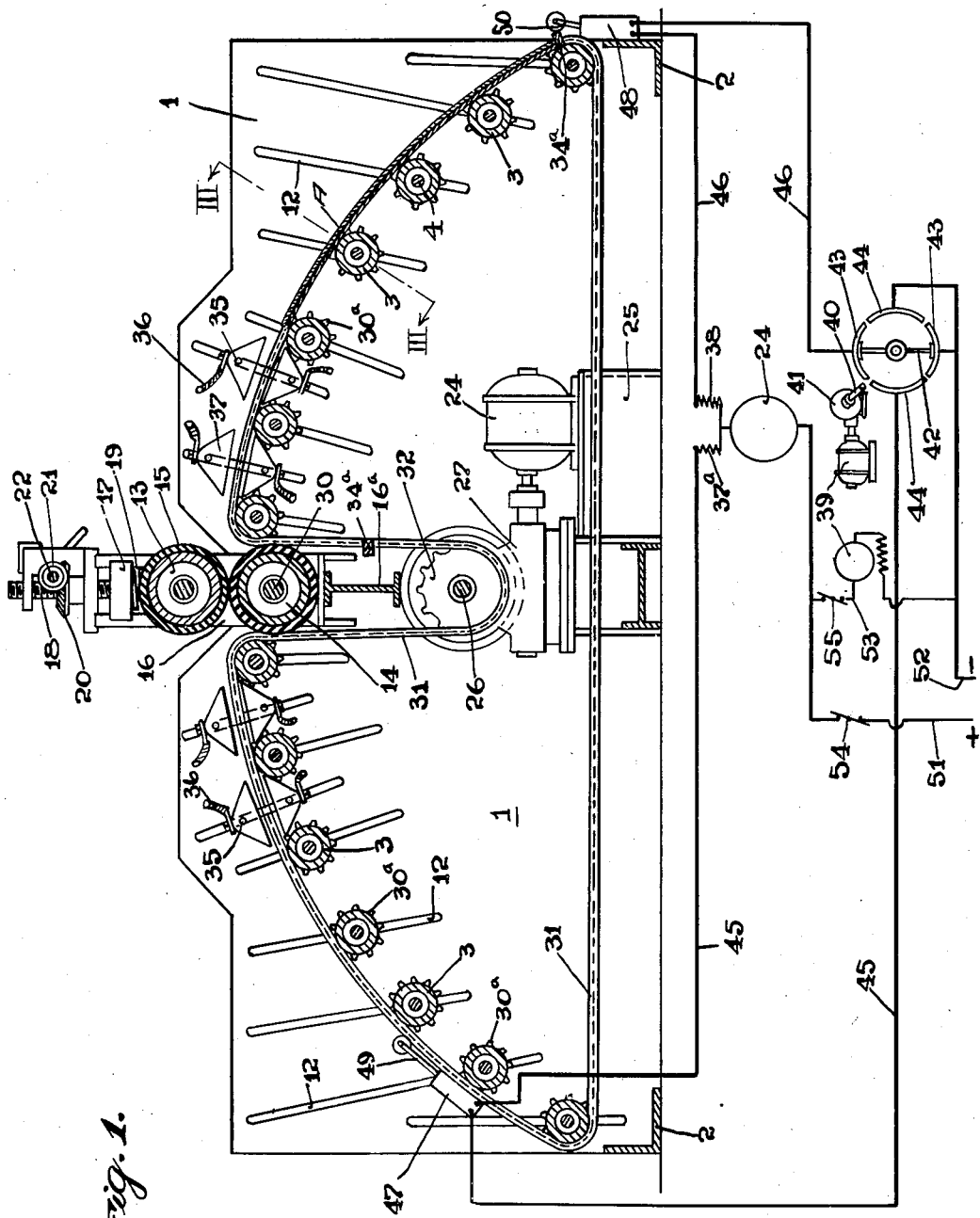

Dec. 24, 1935.  W. O. LYTLE  2,025,115
APPARATUS FOR MAKING CURVED SAFETY GLASS
Filed March 13, 1935  2 Sheets-Sheet 1

INVENTOR.
W. ORLAND LYTLE
BY
ATTORNEYS.

Dec. 24, 1935.  W. O. LYTLE  2,025,115
APPARATUS FOR MAKING CURVED SAFETY GLASS
Filed March 13, 1935  2 Sheets-Sheet 2
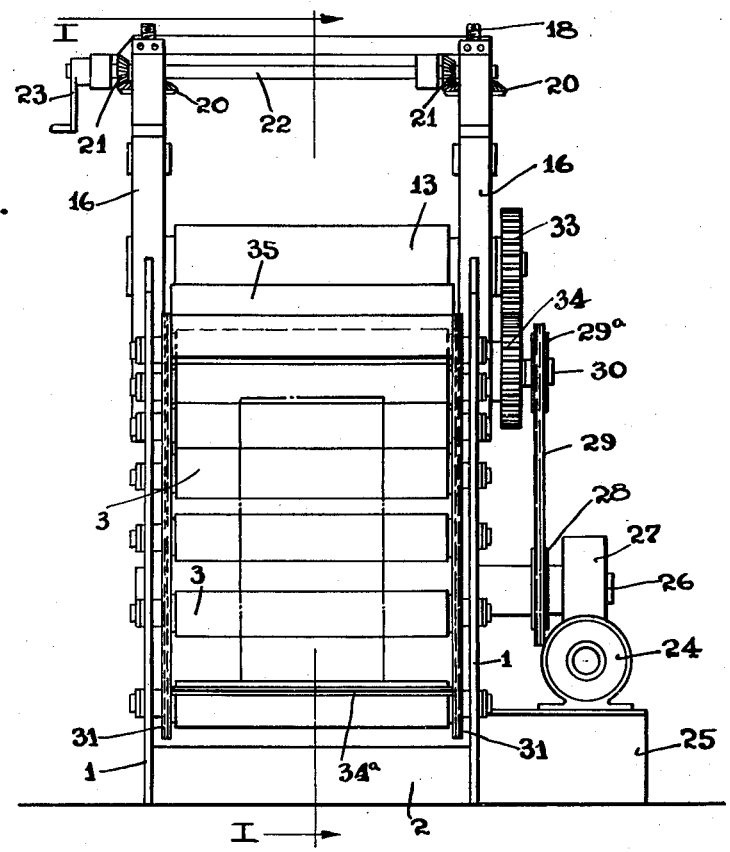
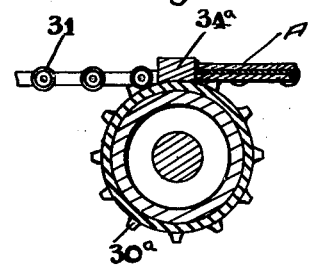
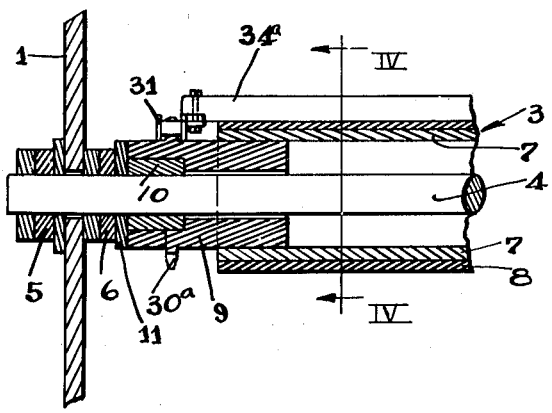
INVENTOR.
W. ORLAND LYTLE
BY Bradley & Bee
ATTORNEYS.

Patented Dec. 24, 1935

2,025,115

UNITED STATES PATENT OFFICE 2,025,115

APPARATUS FOR MAKING CURVED SAFETY GLASS

William Orland Lytle, New Kensington, Pa., assignor to Duplate Corporation, a corporation of Delaware Application March 13, 1935, Serial No. 10,824

8 Claims. (Cl. 49—81)

The invention relates to apparatus for laminating sheets of glass and reinforcing material in the production of curved safety glass, such glass consisting ordinarily of two sheets of glass with an interposed sheet of reinforcing cemented or otherwise secured together by the application of heat or pressure. Heretofore this operation has been accomplished by placing the assembled sandwich in a rubber container and subjecting it to hydraulic pressure in a tank of hot liquid. The object of the present invention is the provision of improved apparatus for applying the necessary heat and pressure without the use of the rubber containers. In most cases, the apparatus is used only to preliminarily secure the sheets together, the final pressing being accomplished in a hydraulic tank in which the sandwiches are exposed directly to heated liquid under high pressure, but in other cases, the apparatus may be employed to completely and finally laminate the sandwiches. Certain embodiments of the invention are illustrated in the accompanying drawings, wherein:

Figure 1 is a vertical section through the apparatus on the line I—I of Fig. 2. Fig. 2 is an end view of the apparatus. And Figs. 3 and 4 are detail views, Fig. 3 being a section taken on the line III—III of Fig. 1, and Fig. 4 a section on the line IV—IV of Fig. 3.

Referring to the drawings, the framework of the machine is made up of a pair of parallel side plates 1, 1, tied together at their lower edges by the transverse angle members 2, 2. Mounted in the frame is a roller runway made up of the series of roll 3, 3, 3, etc. arranged so that the runway has the same curvature as the sheets to be laminated. Each roll is mounted upon a shaft 4 clamped at each end to the side plate 1 by the pairs of nuts 5, 6 (Fig. 3). The roll comprises a hollow shell 7 of metal provided with a rubber sheath 8. Welded in each end of these rolls is a bearing block and interposed between the interior of this block and the shaft 4 is a roller bearing 10. A washer 11 is interposed between the end of the bearing block and the nut 6, 6. In order that the rolls may be adjusted to give the runway a contour which suits the lamination of sheets of varying curvature, the roll shafts are mounted in slots 12 in the side plates 1. This permits the apparatus to be used in a wide variety of work.

Interposed in the runway are the presser rolls 13 and 14 which apply the pressure necessary in order to laminate the sheets of glass and their reinforcing. These rolls are of metal covered with a rubber sheath 15 so as to avoid injury to the surface of the glass sheets during the pressing operation. The ends of the roll shafts are mounted in suitable bearing blocks and these bearing blocks are in turn mounted in the frame members 16, 16 supported on the side plates 1, 1 and on the transverse I-beam 16a, which acts as a tie member between the side plates. Above the bearing blocks at each end of the roll 13 is a block 17 adjustable up and down by means of a screw 18. Springs 19 are interposed between the lower sides of the blocks 17 and the bearing blocks which carry the shaft of the roll 13. The blocks 17 are adjusted downwardly by means of the screws 18 which are threaded through the hubs 16 of the gears 20, such hubs being swivelled upon the frame members 16. The gears 20 are rotated by the bevel pinions 21 carried upon a transverse shaft 22, which shaft is provided at one end with a crank 23. Means are thus provided for adjusting the pressure between the rolls 14 and 15.

Provision is made for driving the runway rolls 3 and the presser rolls 13, 14 in the same direction and at the same peripheral speed from the electric motor 24 mounted upon the frame 25. The motor 24 drives the cross shaft 26 through the worm gear reducer 27, and the shaft 26 carries a sprocket 28 (Fig. 2) around which passes the drive chain 29, such chain also passing around a sprocket 29a (Fig. 2) on the end of the shaft 30 of the roll 14. The blocks 9 at the ends of each of the runway rolls 3 are provided with sprockets 30a and the chains 31, 31 pass around these sprockets (Fig. 2) and around sprockets 32 on the cross shaft 26, as indicated in Fig. 1. The roll 13 is driven from the roll 14 by means of the spur gears 33 and 34 mounted upon the shafts of the rolls. Pusher bars 34a (Figs. 1 and 4) carried by the chains 31 engage the ends of the sandwich A to be laminated and carry it along the runway and between the presser rolls, as later described.

In operation, a set of sheets to be laminated, ordinarily a pair of glass sheets with an interposed sheet of cellulose plastic prepared for adhesion, as shown at A, are placed upon the runway, and the motor 24 is operated to carry the sandwich back and forth on the runway between the presser rolls 13 and 14, the sandwich passing completely through the rolls on each movement. Heat is supplied to promote the adhesion of the sheets by means of resistance elements 35 arranged above and below the line of travel of the runway and extending transversely of such runway. Current is supplied for heating these elements through the leads 36, and in order to secure the full heating effect, the reflectors 37 are employed surrounding the heating elements. The sheets on the runway are thus subject to heat and pressure sufficient to laminate them, the sandwich being carried back and forth on the runway by reversal of the motor 24 until this result is accomplished.

Means for securing the automatic reversal of the motor 24 at the end of the travel of the set of sheets in each direction will be seen by reference to Fig. 1, which diagrammatically indicates the apparatus employed. As here shown, the motor 24 is of the split field type, 37a and 38 being the two sections of the motor field. In addition to this motor, a control motor 39 is employed driving a shaft 40 through the reducer 41, and such shaft 40 operates a rotary switch arm 42 adapted in one position to connect the switch segments 43, 43, and in another position to connect the switch segments 44, 44. The field windings 37a and 38 of the motor 24 lie in circuits including the connections 45 and 46 respectively and these connections pass through limit switches 47 and 48. These switches have arms 49 and 50 provided with rolls lying in a path of travel of the pushbars 34a on the runway and such arms are normally spring held in positions closing the circuits through connections 45 and 46. When the sandwich A reaches an extreme position, as indicated at Fig. 1, the push bar 34a engages the roller on the arm 50 and breaks the circuit through the connections 46. When the sandwich moves to the left from this position, the arm 50 is returned by a spring to its former position closing the circuit 46. Current for operating the system is supplied from the leads 51 and 52, suitably connected to the two motors and to the rotary switch mechanism as shown, connections 51 and 53 being provided with the hand switches 54 and 55, which are closed in the normal operation of the apparatus.

The operation of this apparatus is as follows: Assuming that the sandwich A has reached the position shown in Fig. 1 and moved the limit switch to the open position shown, this movement interrupts the circuit which has previously been flowing through the field 38 of the motor 24 via the connection 51, connection 46, switch arm 42, and connection 52, so that the motor is stopped and the parts remain in the position shown until the rotating switch arm 42 connects the switch segments 44, 44. Current now flows through the field section 37a via the connection 51, the connection 45, limit switch 47, switch arm 42 and connection 52 so that the motor 24 moves in the reverse direction, as compared with its previous movement, and the sandwich A is carried to the left between the presser rolls and onto the runway at the left side of such rolls. During this movement, the switch arm 42 has been rotating in a clockwise direction and again reaches the position indicated in Fig. 1, so that the arm 42 connects the switch segments 43, 43. This causes interruption of the circuit through the connection 45 and motor field section 37a, and the field section 38 is energized due to the passage of the current through the connection 46 so that the motor is reversed. The operation as thus described does not bring into play the limit switch 47. This comes into play in case the rotary switch arm 42 is not synchronized so as to engage the segments 43, 43 before the second push bar 34a reaches the end of its travel to the left. In the latter case, the limit switch 47 comes into play since the push bar engages the arm 49 and breaks the circuit 45, thus stopping the motor 24 so that such motor remains idle until the arm 42 does contact with the switch segments 43, 43, at which time the motor starts up and the sandwich is carried to the right. The limit switches thus operate as safety devices and to avoid the requirement of closely timing the rotary switch. They are preferably arranged so that they may be adjusted in position longitudinally of the runway, the switch 47 being shown adjusted to a different position with respect to the runway than the switch 48.

The cycle, as above described, is subject to modification depending on requirements. For example, the motor may be operated at a lower speed before the sandwich reaches the presser rolls than during the passage of the sandwich between such rolls so as to give relatively longer heating periods as compared with the pressing period, and the entire cycle may be speeded up as the pressing progresses. These variations may be accomplished automatically by the use of suitable timing and regulating devices. The number of pressing cycles for each sandwich may also be varied to suit requirements depending on whether the pressing operation involves a completion of the lamination or is merely preliminary to a final hydraulic pressing in a tank.

What I claim is:

1. In apparatus for making safety glass consisting of curved sheets of glass and an interposed sheet of reinforcing material, a roller runway curved to correspond to the curvature of the glass sheets, a pair of presser rolls intermediate the ends of the runway, drive means for rotating the rolls of the runway and the presser rolls, and reversing means controlling the drive means whereby the rolls may be rotated first in one direction and then in the other direction to carry the sheets to be laminated back and forth between the presser rolls.

2. In apparatus for making safety glass consisting of curved sheets of glass and an interposed sheet of reinforcing material, a roller runway curved to correspond to the curvature of the glass sheets, a pair of presser rolls intermediate the ends of the runway, drive means for rotating the rolls of the runway and the presser rolls, and automatically operated reversing means controlling the drive means whereby the rolls may be rotated first in one direction and then in the other direction to carry the sheets to be laminated back and forth between the presser rolls.

3. In apparatus for making safety glass consisting of curved sheets of glass and an interposed sheet of reinforcing material, a roller runway curved to correspond to the curvature of the glass sheets, supporting means for the runway rolls permitting their adjustment to adapt the apparatus to sheets of different curvature, drive means for rotating the rolls of the runway and the presser rolls, and reversing means controlling the drive means whereby the rolls may be rotated first in one direction and then in the other direction to carry the sheets to be laminated back and forth between the presser rolls.

4. In apparatus for making safety glass consisting of curved sheets of glass and an interposed sheet of reinforcing material, a roller runway curved to correspond to the curvature of the glass sheets, a pair of presser rolls intermediate the ends of the runway, drive means for rotating the rolls of the runway and the presser rolls, heating means on each side of the presser rolls in proximity to the line of travel of the sheets carried by the runway, and reversing means controlling the drive means whereby the rolls may be rotated first in one direction and then in the other direction to carry the sheets to be laminated back and forth between the presser rolls.

5. In apparatus for making safety glass consisting of curved sheets of glass and an interposed sheet of reinforcing material, a roller runway curved to correspond to the curvature of the glass sheets, a pair of presser rolls intermediate the ends of the runway, drive means for rotating the rolls of the runway and the presser rolls, and reversing means controlling the drive means whereby the rolls may be rotated first in one direction and then in the other direction to carry the sheets to be laminated back and forth between the presser rolls, said drive and reversing means including a split field electric motor and a motor driven switch controlling the flow of current through the field of the split field motor.

6. In apparatus for making safety glass consisting of curved sheets of glass and an interposed sheet of reinforcing material, a roller runway curved to correspond to the curvature of the glass sheets, a pair of presser rolls intermediate the ends of the runway and the presser rolls, drive means for rotating the rolls of the runway and the presser rolls, reversing means controlling the drive means whereby the rolls may be rotated first in one direction and then in the other, said drive and reversing means including a split field electric motor and a motor driven switch controlling the flow of current through the field of the split field motor, and limit switches for interrupting the motor circuit when the sheets on the runway approach the ends thereof.

7. In apparatus for making safety glass consisting of curved sheets of glass and an interposed sheet of reinforcing material, a roller runway curved to correspond to the curvature of the glass sheets, a pair of presser rolls intermediate the ends of the runway, drive means for rotating the rolls of the runway and the presser rolls, including sprocket chains at each side of the runway in driving engagement with the rolls thereof, push bars carried by the chains for engaging the ends of the sheets on the runway, and reversing means controlling the drive means whereby the rolls may be rotated first in one direction and then in the other direction to carry the sheets to be laminated back and forth between the presser rolls.

8. In apparatus for making safety glass consisting of curved sheets of glass and an interposed sheet of reinforcing material, a roller runway curved to correspond to the curvature of the glass sheets, a pair of presser rolls intermediate the ends of the runway, drive means for rotating the rolls of the runway and the presser rolls, including sprocket chains at each side of the runway in driving engagement with the rolls thereof, push bars carried by the chains for engaging the ends of the sheets on the runways, reversing means controlling the drive means whereby the rolls may be rotated first in one direction and then in the other, said drive means, including a split field electric motor and a motor driven switch controlling the flow of current through the field of the split field motor, and limit switches in the line of travel of the push bars and adapted to be opened thereby and interrupt the motor circuit when the push bars approach the ends of the runway.

WILLIAM ORLAND LYTLE.